United States Patent [19]

Cammiss et al.

[11] Patent Number: 5,221,571
[45] Date of Patent: Jun. 22, 1993

[54] ACTIVATED EARTH POLYETHYLENE FILM

[75] Inventors: Mark A. Cammiss, Mount Waverley; Gaetano Russo, Parkdale, both of Australia

[73] Assignee: Ausdel Pty. Ltd., Victoria, Australia

[21] Appl. No.: 646,755

[22] PCT Filed: Sep. 6, 1990

[86] PCT No.: PCT/AU90/00400
§ 371 Date: Mar. 18, 1991
§ 102(e) Date: Mar. 18, 1991

[87] PCT Pub. No.: WO91/03516
PCT Pub. Date: Mar. 21, 1991

[30] Foreign Application Priority Data

Sep. 6, 1989 [AU] Australia .................. PJ6167

[51] Int. Cl.$^5$ ............................... B32B 7/02
[52] U.S. Cl. ............................ 428/220; 426/106; 426/118; 426/404; 426/415; 428/35.5; 428/35.7; 428/36.5; 428/315.5; 428/329; 428/331; 428/523; 428/702
[58] Field of Search ............ 428/35.2, 220, 35.5, 428/35.7, 36.5, 315.5, 331, 338, 339, 913, 426, 702, 523, 441, 329; 426/404, 415, 118, 106

[56] References Cited

U.S. PATENT DOCUMENTS

| | | | |
|---|---|---|---|
| 3,088,844 | 5/1963 | Hungerford et al. | 428/349 |
| 3,790,402 | 2/1974 | Eastes | 428/336 |
| 4,423,080 | 12/1983 | Bedrosian et al. | 426/124 |
| 4,840,823 | 6/1989 | Chigami et al. | 428/35.5 |
| 4,937,115 | 6/1990 | Leatherman | 428/36.4 |
| 4,939,030 | 7/1990 | Tsuji et al. | 428/315.5 |

FOREIGN PATENT DOCUMENTS

| | | | |
|---|---|---|---|
| 62212445 | 9/1978 | Japan . | |
| 60-10458 | 4/1979 | Japan | 426/415 |

Primary Examiner—Paul J. Thibodeau
Assistant Examiner—Hoa T. Le
Attorney, Agent, or Firm—Samuels, Gauthier & Stevens

[57] ABSTRACT

The present invention provides a plastic packaging for fresh fruit, vegetables and cut flowers. The film comprises 1 to 10% Activated Earth incorporated in polyethylene. The Activated Earth modifies the gas permeabilities of the film so that it interacts with the metabolic activity of the fresh produce modifying the atmosphere around it. It does this by modifying the permeability of the film to the various atmospheric gases. The Activated Earth is characterized by its predominantly porous aluminium/silicate composition, a pore diameter of 50,000 Angstroms, a specific surface of 0.6 m$^2$/gm and a specific gravity of 2.3.

6 Claims, No Drawings

ACTIVATED EARTH POLYETHYLENE FILM

FIELD OF THE INVENTION

This invention relates to a plastic film packaging material that contains a uniform dispersion of porous powder. The film can be used to preserve fruits, vegetables and cut flowers by controlling the concentrations of oxygen, carbon dioxide, ethylene and humidity surrounding the produce.

PRIOR ART

It is well known that all fruits, vegetables and cut flowers age and deteriorate after harvesting. This deterioration occurs via several mechanisms and the most important of these are dehydration where moisture is lost from the produce, internal biological changes where starches are converted into sugars, attach by bacteria and attack by fungi.

Various methods are used to reduce the rate of deterioration. The main one is cooling the produce to as low a temperature as possible without causing chilling injury. This reduces the rate at which bacteria and fungi multiply and reduces the metabolic rate of the produce. Cooling generally involves the use of refrigeration in one form or another which tends to dehydrate the produce unless additional humidification equipment is installed with the refrigeration. This is generally not done and is quite difficult to do on domestic refrigerators.

An improvement on cooling the produce is to cool the produce and modify the atmosphere surrounding it. This technique is commonly called Controlled Atmosphere storage when applied to bulk storage of produce and is widely practiced in the storage of apples. Typically, the oxygen concentration surrounding the produce is reduced from 21% to between 0.5% and 2% and the carbon dioxide concentration is increased from 0.03% to 1 to 10%. When applied to the wrapping of produce with a film, the technique is called Modified Atmosphere packaging.

Compared with cooling alone, CA storage and MA packaging usually improve the storage life of produce because firstly, the modified atmosphere slows down the rate of respiration via chemical signals and secondly, the modified atmosphere reduces the rate of bacteria and fungi growth.

Many films and bags have been developed to improve the storage life of produce. The simplest of these is a plain polyethylene (PE) bag which is cheap to manufacture and does not contaminate the produce. Plain PE films and bags have low gas permeabilities and suffer from excess condensation of water inside the bag which promotes decay by bacteria and fungal attack. The produce stored within a polyethylene bag is alive and respires by consuming oxygen and giving off carbon dioxide.

A major problem with storing produce in a plain PE bag is the fact that oxygen within the bag can go below 0.5% and the produce can go into anaerobic decay. Alternatively, the carbon dioxide concentration can increase to levels that injure the produce well before the oxygen concentration gets to dangerously low levels. Plain polyethylene bags are not permeable enough for the long term storage of most produce.

Some films overcome this permeability problem by having small holes punched into the film. This is generally satisfactory for humidity control but is unsatisfactory to maintain a CA or MA environment around the produce because the permeability is too high.

Microporous films have been developed which provide a good permeability characteristic, but these films are opaque and do not permit visual inspection of the produce without opening the bag and detrimentally disturbing the modified atmosphere.

Chigami et al, U.S. Pat. No. 4,840,823 disclose that the addition of a naturally porous silica CRISBAL in polyethylene improves the storage life of fruits and vegetables. The CRISBAL is hydrophillic and absorbs water, ethylene, carbon dioxide and other gases. A favourable atmosphere is provided around the produce by gas absorption into the CRISBAL rather than by modifications to the polyethylene permeability. The main problem with this film is that to ensure reasonable film clarity, processability into bags and tear strength, only 3 wt % to 5 wt % of CRISBAL is added to polyethylene vs up to 50 wt % detailed in the patent. With such a low concentration of CRISBAL in the film, there is insufficient CRISBAL to absorb all of the water, carbon dioxide and other gases given off by most produce stored within the bag.

Tsuji et al, U.S. Pat. No. 4,939,030 disclose a laminated film construction comprising a microporous film plus water absorbing layer to control humidity and a synthetic resin (PE) film layer to control oxygen and carbon dioxide. The problems associated with this laminated film are the high costs of construction and the poor clarity which does not allow visual inspection of the produce without opening the bag and destroying the beneficial CA environment.

DESCRIPTION OF THE INVENTION

This invention relates to the preservation of a range of produce including fruits, vegetables and cut flowers by the use of a specially engineered Activated Earth Plastic Film (AEP Film). This film may be wrapped around the produce or may be made into bags if desired for convenient packaging of the produce.

The plastic film can be made from a range of plastics including polyethylene, polypropylene or PVC. Polyethylene is considered to be the best plastic to use because it has superior gas permeability characteristics, strength and film characteristics and does not suffer the food contamination problems that PVC does with vinyl chloride monomer. For example, compared with the plastics listed above, polyethylene has low permeability to water vapour and high permeability to gases like carbon dioxide ($CO_2$), sulphur dioxide ($SO_2$), oxygen ($O_2$) and ethylene. These characteristics allow polyethylene to maintain a high humidity environment around the produce with low water loss whilst permitting a rapid exchange of gases via the Activated Earth in the film.

The Activated Earth must be highly porous and have the ability to chemically and/or physically promote the passage of the various gaseous molecular species formed by or used by fresh produce in such a manner as to ensure oxygen is not totally depleted from the produce atmosphere and that carbon dioxide does not increase to dangerous levels.

This invention combines the properties of polyethylene film with such an Activated Earth to make an AEP film which interacts with the natural respiration of the produce wrapped within the film to develop and maintain a controlled atmosphere around the produce.

This invention differs from the current practice of packing with a modified atmosphere (i.e. adding various gases to the package) in that the produce is wrapped in AEP film and the properties of AEP film develop and then maintain a modified atmosphere around the produce as it respires. The development and maintenance of a modified atmosphere results in longer storage life of the produce.

The presence of Activated Earth alters the relative gas permeabilities of oxygen, nitrogen, carbon dioxide, water and ethylene compared with plain polyethylene film resulting in a better and continually adjusted modified atmosphere for longer produce storage life. Activated Earth is a term used to describe a composition of inorganic compounds which may be silica-based, or based on a composition of alumina and silica. The Activated Earth must meet three further criteria, namely that it is sufficiently: (a) inert; (b) porous; and (c) capable of physically bonding with gases such as oxygen, carbon dioxide and the like. In this specification the term Activated Earth is given to compositions meeting these criteria to such an extent they perform the intended function of Activated Earth.

The mechanism by which the gas permeability are altered is through the physical characteristics of the Activated Earth and its interaction with the plastic. The plastic layer around the Activated Earth particles provides a primary control to permeability of the various gases. The molecular conduits or passages within the Activated Earth selectively control the passage of the various gases from the inside of the film next to the produce to the outside atmosphere.

The pores within the Activated Earth allow two-way flow and, in controlling the various gases at rates specific to their molecular structure and attendant properties, allow the build up of carbon dioxide around the fresh produce to levels that affect the respiration rate, sowing it down and reducing metabolic rate and therefore ageing. At the same time it allows oxygen to flow back from outside of the produce package at the rate that it is used up inside of the package at the reduced metabolic rate. This mechanism ensures the maintenance of an atmosphere around the produce which ensures that the produce stays alive and does not progress to a state leading to anaerobic decay through lack of oxygen.

Anaerobic decay occurs in normal PE films. The conventional answer to this has been to perforate conventional films and therefore allow oxygen free passage to the produce. The holes thus produced are so large, on the molecular scale, that they do not allow carbon dioxide to be retained. They therefore fail to provide the controlled atmosphere required to control the metabolic rate of the produce and therefore retain youth and freshness.

AEP film reacts to the demands of the produce it is protecting because it operates at the molecular level.

Compared with the standard films in use today, AEP Film doubles the storage life of some fruits, vegetables and flowers. Use of AEP Film will reduce the spoilage of these produce during storage, transport and in the home.

The dramatic increase in produce preservation resulting from AEP Film is achieved by mixing a small quantity of Activated Earth with the appropriate polyethylene plastic resin to give a uniform dispersion of Activated Earth particles within the film. The quantity of Activated Earth can be in the range of 1% to 10% by weight of the film but most preferably in the range of 3% to 6%.

The AEP Film can be made from Low Density Polyethylene (LDPE), Linear Low Density Polyethylene (LLDPE) or High Density Polyethylene (HDPE) with additives as required for improved processability of the film. The film thickness can be in the range of 10 microns to 150 microns but more preferably in the range of 25 microns to 50 microns.

The Activated Earth particle size should be uniform and range up to 75 micron, but a preference is that greater than 50% should lie in the range of 15 to 50 micron with a maximum size no greater than the thickness of the polyethylene film.

A typical composition of Activated Earth is as follows:

| | | |
|---|---|---|
| Silicon Dioxide | $SiO_2$ | 65–70% |
| Aluminium Oxide | $Al_2O_3$ | 10–15% |
| Iron Oxide | $Fe_2O_3$ | 2% |
| Sodium Oxide | $Na_2O$ | 4% |
| Potassium Oxide | $K_2O$ | 4% |
| Titanium Dioxide | $TiO_2$ | 0.1% |
| Trace quantities of | FeO, MnO, CaO, MgO, $P_2O_5$ | |
| Pore Diamter (Angstroms) | | 50,000 |
| Specific Surface ($m^2$/gm) | | 0.6 |
| Specific Gravity | | 2.3 |

EXAMPLES

Banana

Bananas which had been gassed with ethylene to start them ripening were placed in a bag of AEP film and stored at 15.5° C. A control quantity was stored alongside but without the protection of AEP film. The AEP film delayed the onset of ripening by four days.

Broccoli

Broccoli were stored for 6 weeks at 1° C. in AEP bags. Two controls were also stored, one packed in normal polyethylene bags and the other without any protection. The broccoli stored in the AEP bag outlasted the controls by 4 weeks and 5 weeks respectively.

Cauliflower

Cauliflower were stored at 15° C. in AEP film with controls stored alongside in conventional polyethylene film. After 14 days those stored in AEP film were still fresh and with no off odours, whereas the controls were unsaleable with offensive odours indicating anaerobic decay.

Lettuce

Lettuce were stored at 25° C. in AEP bags and after 1 week they were still fresh and saleable, whereas the controls were totally unsaleable.

Carnations

Carnations were stored at 3° C. to 6° C. in AEP bags over a period of 21 days. These were then compared with fresh carnations for their life in a vase. The AEP stored carnations had an equivalent post storage life to the fresh controls.

Roses

Roses have been stored at the bud stage at 3° C. to 6° C. in AEP bags for periods up to 14 days. Following this period the buds have opened normally.

We claim:

1. A plastic film which develops and maintains a controlled atmospheric environment around produce such as fruits, vegetables and cut flowers to increase produce storage life, the film having a thickness in the range of 10 to 150 microns and impregnated with porous activated earth particles having a pore diameter of about 50,000 Å, a specific surface area of about 0.6 m$^2$/g and a specific gravity of about 2.3 and diameters about 75 microns or less and in a concentration of 1% to 10% by weight of the film, which particles alter the gas permeability properties of the film with respect to oxygen, nitrogen, carbon dioxide, water and ethylene and absorb deleterious gases surrounding the produce.

2. The plastic film of claim 1, selected from the group consisting essentially of polyethylene, polypropylene and PVC.

3. The plastic film of claim 2, wherein the film is polyethylene.

4. The plastic film of claim 3, wherein the thickness of the polyethylene film is in the range of 25 to 50 microns.

5. The plastic film of claim 1, wherein at least 50% of the activated earth particles are within the range of 15 to 50 microns.

6. The plastic film of claim 1, wherein the concentration of Activated Earth particles is in the range of 3 to 6% by the weight of the film.

* * * * *